(12) United States Patent
Wei

(10) Patent No.: US 12,546,397 B2
(45) Date of Patent: Feb. 10, 2026

(54) FLOW REGULATING PUSH SWITCH CONJOINED VALVE

(71) Applicant: Black & Decker, Inc., New Britain, CT (US)

(72) Inventor: Hu Wei, Cixi (CN)

(73) Assignee: BLACK & DECKER INC., New Britain, CT (US)

(*) Notice: Subject to any disclaimer, the term of this patent is extended or adjusted under 35 U.S.C. 154(b) by 0 days.

(21) Appl. No.: 18/221,044

(22) Filed: Jul. 12, 2023

(65) Prior Publication Data

US 2024/0019031 A1    Jan. 18, 2024

(30) Foreign Application Priority Data

Jul. 15, 2022  (CN) .................. 202221839573.X

(51) Int. Cl.
    *F16K 1/52* (2006.01)
(52) U.S. Cl.
    CPC .................................. *F16K 1/526* (2013.01)
(58) Field of Classification Search
    None
    See application file for complete search history.

(56) References Cited

U.S. PATENT DOCUMENTS

| | | | |
|---|---|---|---|
| 3,538,951 A * | 11/1970 | Bownass | F16K 1/526 251/129.08 |
| 4,921,013 A * | 5/1990 | Spalink | F16L 37/36 137/614.01 |
| 5,135,198 A | 8/1992 | Freund et al. | |
| 6,644,625 B1 * | 11/2003 | Jacobs | B05B 12/0024 251/309 |

FOREIGN PATENT DOCUMENTS

| | | | |
|---|---|---|---|
| CN | 113028081 A | * | 6/2021 |
| EP | 3385580 A1 | | 10/2018 |
| JP | S5356721 A | | 5/1978 |

OTHER PUBLICATIONS

European Patent Office, "The extended European search report for EP Application No. 23182366.7", mailed Nov. 22, 2023, 9 pages.

* cited by examiner

*Primary Examiner* — Matthew W Jellett

(74) *Attorney, Agent, or Firm* — Mannava & Kang, P.C.

(57) ABSTRACT

The present invention discloses a flow regulating push switch conjoined valve, comprising a valve housing, a flow regulation assembly and a push switch assembly. The valve housing has a first chamber and a second chamber which are isolated from each other, a communication channel is disposed between the first chamber and the second chamber, and a first connection pipe and a second connection pipe are devised on the valve housing. The first connection pipe has a first channel which is in communication with the first chamber and the second connection pipe has a second channel which is in communication with the second chamber. The flow regulation assembly is installed in the first chamber for regulating a flow rate of a fluid between the first channel and the communication channel. The push switch assembly is installed in the second chamber for controlling connection and disconnection of a flow path between the second channel and the communication channel.

9 Claims, 4 Drawing Sheets

FLOW REGULATING PUSH SWITCH CONJOINED VALVE

CROSS-REFERENCE TO RELATED APPLICATIONS

The present application claims priority under 35 U.S.C. § 119 to Chinese Utility Model Application No. 202221839573.X filed on Jul. 15, 2022, which is herein incorporated by reference in its entirety.

BACKGROUND OF THE INVENTION

Field of the Invention

The present invention relates to the technical field of fluid control equipment, in particular to a flow regulating push switch conjoined valve. Switch valve and regulating valve are two common fluid control valves. The switch valve is used for controlling connection and disconnection of a fluid flow path, and the regulating valve is used for regulating the flow rate of the fluid, both of which are widely used in household appliances such as steam cleaner, floor cleaning machine etc. The current design trend of household appliances is miniaturization and functionalization. However, the application of two separate valve bodies (a switch valve and a regulating valve) in a steam cleaning machine is obviously disadvantageous for compactness and miniaturization of the structure of the steam cleaning machine. Hence, it is necessary to design an integral valve with both switching and regulating functions, which is also a general trend.

SUMMARY OF THE INVENTION

To overcome the above deficiencies in the prior art, the present invention provides a flow regulating push switch conjoined valve. It is compact in structure, small in volume, and has the functions of flow regulation and push switch, meeting the needs of miniaturization and functionalization of household appliances.

a. In order to achieve the above objectives, the present invention provides a flow regulating push switch conjoined valve, comprising: a valve housing, a flow regulation assembly and a push switch assembly. The valve housing has a first chamber and a second chamber which are isolated from each other and which are used to install the flow regulation assembly and the push switch assembly respectively. A communication channel is devised on the valve housing between the first chamber and the second chamber. A first connection pipe and a second connection pipe are devised on the valve housing, the first connection pipe having a first channel which is in communication with the first chamber and a second connection pipe having a second channel which is in communication with the second chamber.

The flow regulation assembly comprises a regulation valve rod which is rotatably installed in the first chamber. The regulation valve rod is provided with a regulating block which is capable of changing a flowable area of a first port of the communication channel or a flowable area of a port of the first channel during the rotation of the regulation valve rod.

The push switch assembly comprises a switch valve rod which is slidably mounted in the first chamber and a return spring which acts on the switch valve rod. The switch valve rod is provided with a plugging block which always has a tendency of motion to block and/or shut off a flow path between the communication channel and the second channel under an action of the return spring, and at the same time, a fluid communication between the second channel and the communication channel can be achieved by pressing to drive the switch valve rod to change the position of the plugging block.

Further configured as: the plugging block blocks and/or shuts off the flow path between the second channel and the communication channel by blocking a second port of the communication channel and/or a port of the second channel, or by being located between the second port of the communication channel and the port of the second channel;

By press driving the plugging block to move above or below both the second port of the communication channel and the port of the second channel, the fluid communication between the second channel and the communication channel is achieved.

Further configured as: the valve housing comprises a housing main body, a first end cover and a second end cover. The housing main body has a first cavity with an opening arranged vertically downwards and a second cavity with an opening arranged in a direction same as or opposite to the opening of the first cavity. The first end cover is sealingly mounted at the opening of the first cavity to cooperatively form the first chamber, and the second end cover is sealingly mounted at the opening of the second cavity to cooperatively form the second chamber.

A first through hole is disposed in a bottom portion of the first cavity, a swivel base having a rotating groove is correspondingly disposed on the first end cover. One end of the regulation valve rod is fittingly mounted in the rotating groove of the swivel base in a rotatable manner, and the other end of the regulation valve rod passes through the first through hole and extends to the outside.

A second through hole is disposed in a bottom portion of the second cavity, a guide base having a guide groove is correspondingly disposed on the second end cover. One end of the switch valve rod is fittingly mounted in the guide groove of the guide base in a slidably movable manner, and the other end of the switch valve rod passes through the second through hole and extends to the outside. One end of the return spring is sleeved on the guide base and abuts against the bottom portion of the second cavity, and the other end of the return spring is sleeved on the switch valve rod and abuts against the plugging block.

Further configured as: a limiting structure for cooperating with an upper end of the regulating block is disposed in the first cavity to achieve positioning. A lower end face of the regulating block is a helical end face structure with a gradually decreasing circumferential end face height. One of the first port of the communication channel and the port of the first channel is correspondingly installed at the regulating block, and the other one of the first port of the communication channel and the port of the first channel is located below the regulating block.

Further configured as: a first sealing ring for fitting with an inner wall of the first cavity is installed on a rod body of the regulation valve rod in, a limiting manner at a position above the corresponding limiting structure, so as to prevent leakage through the first through hole.

Further configured as: a blocking structure is disposed in the second cavity for cooperating with the plugging block to counteract the acting force of the return spring so as to limit continuous movement of the switch valve rod, a second port of the communication channel and a port of the second channel are located at an upper side and a lower side of the blocking structure respectively, the plugging block sealingly fits with the blocking structure.

Further configured as: a second sealing ring is installed on the plugging block in a limiting manner, so as to sealingly fit with the blocking structure.

Further configured as: a third sealing ring for fitting with an inner wall of the second cavity is further installed on the switch valve rod in a limiting manner, so as to prevent leakage through the second through hole.

Further configured as: the opening of the second cavity is arranged vertically upwards.

Further configured as: the first channel, the second channel and the communication channel are all on the same vertical plane.

Compared to the prior art, the structure of the present invention is simple and reasonable. The effective integration of functions of flow regulation and push switch into one valve body brings forth a more compact and miniaturized valve body structure, advantageous for miniaturization and functionalization of household appliances design.

Figure 1:
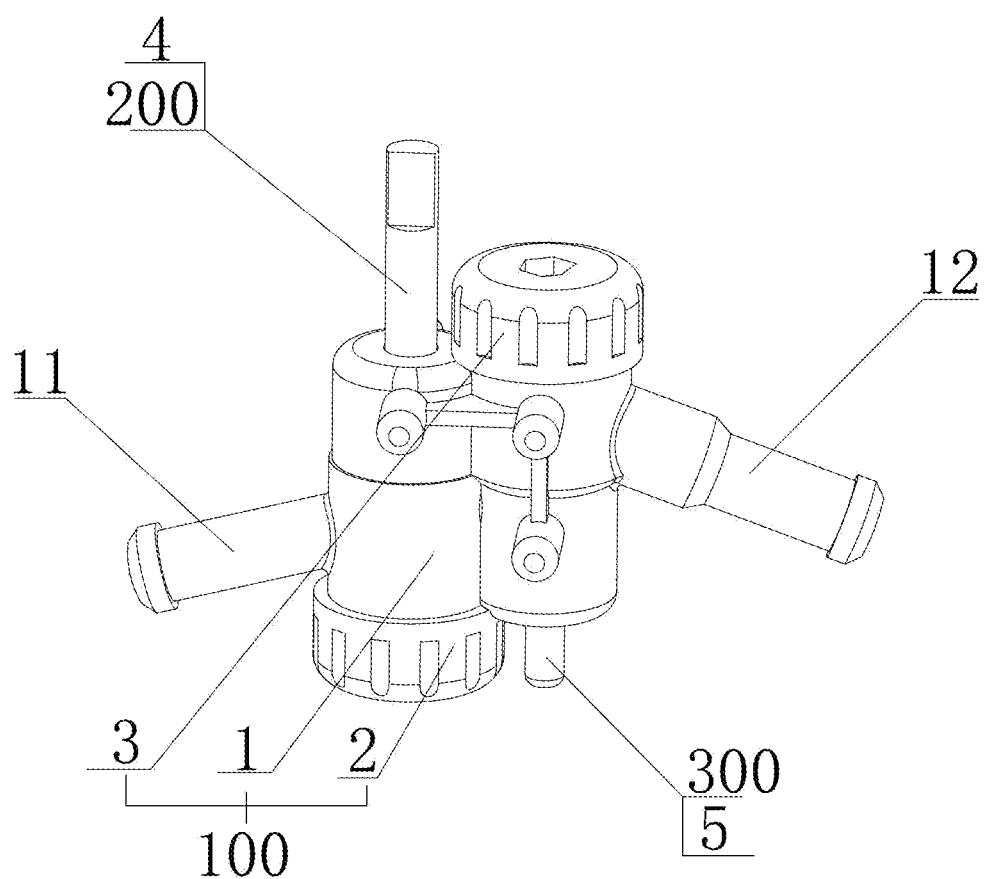
FIG. 1 is a three-dimensional schematic diagram of a flow regulating push switch conjoined valve of the present invention.

The following reference numerals are used in the accompanying drawings:

100. valve housing; 1. housing main body; 11. first connection pipe; 111. first channel; 12. second connection pipe; 121. second channel; 13. first cavity; 131. limiting structure; 14. second cavity; 141. blocking structure; 15. communication channel; 2. first end cover; 21. swivel base; 3. second end cover; 31. guide base; 200. flow regulation assembly; 4. regulation valve rod; 41. regulating block; 411. helical end face; 42. first sealing ring; 300. push switch assembly; 5. switch valve rod; 51. plugging block; 52. second sealing ring; 53. third sealing ring; 6. return spring.

DETAILED DESCRIPTION OF THE INVENTION

An embodiment of the present invention is described in detail below with reference to the accompanying drawings, but it should be understood that the scope of the present invention is not limited by the embodiment.

A flow regulating push switch conjoined valve of the present invention, as shown in FIG. 1 to FIG. 4, comprises a valve housing 100, a flow regulation assembly 200 and a push switch assembly 300. The valve housing 100 has a first cavity 13 and a second cavity 14 which are isolated from each other, and a communication channel 15 is disposed between the first cavity 13 and the second cavity 14. The valve housing 100 is further provided with a first connection pipe 11 having a first channel 111 in communication with the first cavity 13 and a second connection pipe 12 having a second channel 121 in communication with the second cavity 14. The flow regulation assembly 200 is installed in the first cavity 13 of the valve housing 100 for controlling and regulating a flow rate of a fluid between the first channel 111 and the communication channel 15. The flow regulation assembly 200 includes a regulation valve rod 4 rotatably mounted in the first cavity 13. The regulation valve rod 4 is provided with a regulating block 41, which is capable of regulating and changing a flowable area of a first port 16 of the communication channel 15 or a flowable area of a first port 112 of the first channel 111 during the process of rotating the regulation valve rod 4, that is, regulating and changing the area of the first port 16 of the communication channel 15 blocked by the regulating block 41 or the area of the first port 112 of the first channel 111 blocked by the regulating block 41. The push switch assembly 300 is correspondingly installed in the second cavity 14 of the valve housing 100 for controlling connection and disconnection of a flow path between the second channel 121 and the communication channel 15. The push switch assembly 300 includes a switch valve rod 5 slidably mounted in the second cavity 13 and a return spring 6 acting on the switch valve rod 5. A plugging block 51 is disposed on the switch valve rod 5, the plugging block 51 always has a tendency of motion to block and/or shut off the flow path between the communication channel 15 and the second channel 121 under an action of the return spring 6, that is, the plugging block 51 blocks and/or shuts off the flow path between the second channel 121 and the communication channel 15 by blocking the second port 17 of the communication channel 15 and/or the second port 122 of the second channel 121, or by being located between the second port 17 of the communication channel 15 and the second port 122 of the second channel 121. At the same time, a fluid communication between the second channel 121 and the communication channel 15 can be achieved by pressing to drive the switch valve rod 5 to change the position of the plugging block 51, i.e., by pressing the plugging block 51 is driven to move above or below both the second port 17 of the communication channel 15 and the second port 122 of the second channel 121, to achieve the fluid communication between the second channel 121 and the communication channel 15.

Figure 2:
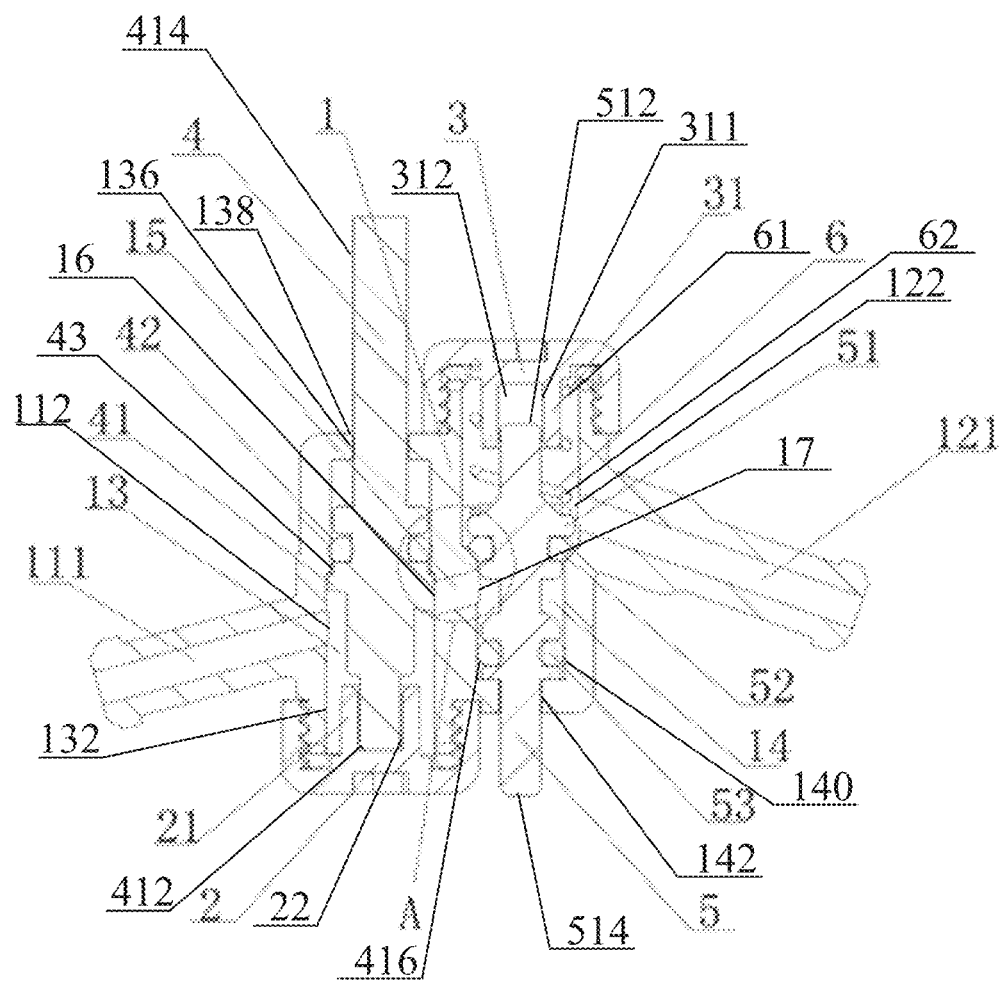
FIG. 2 is a schematic diagram of a vertical cross-section of the flow regulating push switch conjoined valve.

As specifically shown in FIG. 2, the valve housing 100 includes a housing main body 1, a first end cover 2 and a second end cover 3. The housing main body 1 has a first cavity 13 with an opening 132 arranged vertically downwards and a second cavity 14 with an opening 312 arranged in a direction same as or opposite to the opening 132 of the first cavity 13. The first end cover 2 is sealingly mounted at the opening 132 of the first cavity 13 to form the first cavity 13, and the second end cover 3 is sealingly mounted at the opening 312 of the second cavity 14 to form the second cavity 14. The housing main body 1 is provided with a first through hole 136 corresponding to a top portion 138 of the first cavity 13, a swivel base 21 having a rotating groove 22 is correspondingly disposed on the first end cover 2. One end (lower end) 412 of the regulation valve rod 4 is fittingly mounted in the rotating groove 22 of the swivel base 21 in a rotatable manner, and the other end (upper end) 414 of the regulation valve rod 4 passes through the first through hole 136 and extends to the outside to form a rotational drive portion. The housing main body 1 is provided with a second through hole 142 corresponding a bottom portion 140 of the second cavity 14, a guide base 31 having a guide groove 311 is correspondingly disposed on the second end cover 3. One end 512 of the switch valve rod 5 is slidably inserted into the guide groove 311 of the guide base 31, and the other end 514, e.g., an end opposite the one end 512, of the switch valve rod 5 passes through the second through hole 142 and extends to the outside to form a press drive portion.

Figure 3:
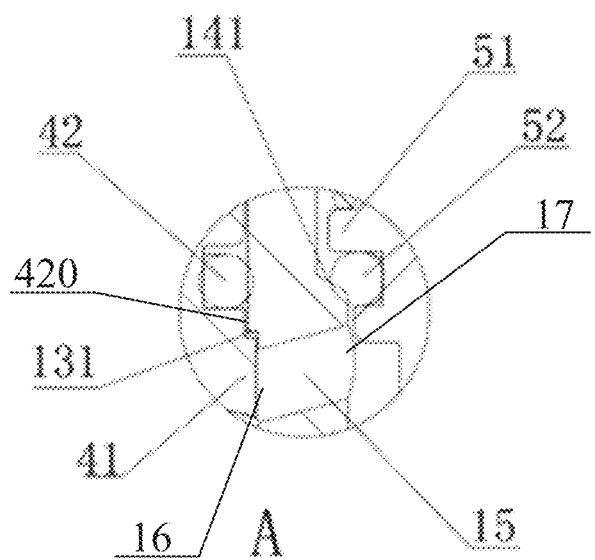
FIG. 3 is an enlarged schematic diagram of part A in FIG. 2.
Figure 4:
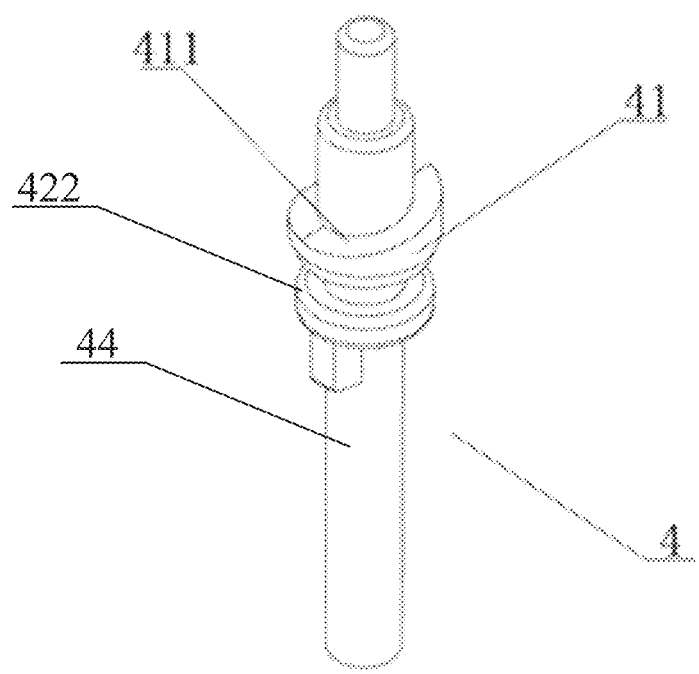
FIG. 4 is a three-dimensional schematic diagram of a regulation valve rod.

As shown in FIGS. 2, 3 and 4, a limiting structure 131 is disposed in the first cavity 13 for cooperating with an upper end 420 of the regulating block 41 of the regulation valve rod 4 to achieve limiting stop and/or positioning. The positioning and rotation of the regulation valve rod 4 inside the first cavity 13 is implemented by the cooperation of the limiting structure 131 and the swivel base 21. A lower end face 422 of the regulating block 41 is a helical end face 411 structure with a gradually decreasing circumferential end face height. One of the first port 112 of the first channel 111 and the first port 16 of the communication channel 15 is disposed corresponding to the regulating block 41, and the other one of the first port 112 of the first channel 111 and the first port 16 of the communication channel 15 is disposed below the regulating block 41. In the present embodiment, the first port 16 of the communication channel 15 is disposed corresponding to the regulating block 41, and the port of the first channel 111 is located below the regulating block 41. Meanwhile, the first cavity 13 is a stepped structure having a lower portion with a large internal diameter and an upper portion with a small internal diameter, the limiting structure 131 of the present invention is formed at a transitional portion between the upper portion and the lower portion of the first cavity 13. Preferably, a first sealing ring 42 is installed on the rod body of the regulation valve rod 4 in a limiting manner at a position above the corresponding limit structure 131, the first sealing ring 42 is sealingly fit with an inner wall 43 of the first cavity 13 to prevent fluid leakage at the first through hole.

As shown in FIG. 2 and FIG. 4, a blocking structure 141 is disposed in the second cavity 14 for cooperating with the plugging block 51 to counteract the acting force of the return spring 6, so as to limit continuous movement of the switch valve rod 5. A second port 17 of the communication channel 15 and the second port 122 of the second channel 121 are respectively located at an upper side and a lower side of the blocking structure 141. The plugging block 51 fits sealingly against the blocking structure 141. Preferably, a second sealing ring 52 sealingly fits with the blocking structure 141 is installed on the plugging block 51 in a limiting manner so as to shut off the flow path between the second channel 121 and the communication channel 15. In the present embodiment, the opening of the second cavity 14 is arranged vertically upwards and the second cavity 14 is a stepped structure having an upper portion with a large internal diameter and a lower portion with a small internal diameter, a transitional portion between the upper portion and the lower portion of the second cavity 14 constitutes the blocking structure 141 of the present invention. The second sealing ring 52 is sealingly fit with a stepped surface of the blocking structure 141. The second port 122 of the second channel 121 is located in the upper portion of the second cavity 14, and the second port 17 of the communication channel 15 is located in the lower portion of the second cavity 14. Preferably, a third sealing ring 53 for coupling with an inner wall 416 of the second cavity 14 is further disposed on the switch valve rod 5 in a limiting manner to prevent leakage through the second through hole, and at the same time ensuring that the downward distance to press open is smaller than the distance between the third sealing ring 53 and the second port of the communication channel 15.

In the embodiment, specifically, the first channel 111, the second channel 121, and the communication channel 15 are all located on the same vertical plane. Meanwhile, the first port 112 of the first channel 111 connected to the first cavity 13 is located below the first port 16 of the communication channel 15 correspondingly connected to the first cavity 13. The first port 16 of the communication channel 15 is located below the second port 17 of the communication channel 15 correspondingly connected to the second cavity 14. The second port 17 of the communication channel 15 is located below the second port 122 of the second channel 121 connected to the second cavity 14.

Compared to the prior art, the structure of the present invention is simple and reasonable The effective integration of functions of flow regulation and push switch into one valve body brings forth a more compact and miniaturized valve body structure, advantageous for miniaturization and functionalization of household appliances design.

The disclosure above is merely an embodiment of the present invention, but the present disclosure is not limited thereto, any modifications conceivable by those skilled in the art shall fall within the protection scope of the present invention.

I claim:

1. A flow regulating push switch conjoined valve, comprising:
   a valve housing comprising:
      a housing main body;
      a first cavity and a second cavity formed in the housing main body, the first cavity has an opening arranged vertically downwards and the second cavity has an opening arranged in a direction opposite to the opening of the first cavity, wherein a first through hole is disposed in the housing main body at a top portion of the first cavity and a second through hole is disposed in the housing main body at a bottom portion of the second cavity;
      a first end cover and a second end cover, wherein the first end cover is sealingly mounted at the opening of the first cavity and cooperatively forms the first cavity, and the second end cover is sealingly mounted at the opening of the second cavity and cooperatively forms the second cavity with the housing main body;
      a communication channel positioned on the valve housing between the first cavity and the second cavity;
      a first connection pipe in communication with the first cavity; and
      a second connection pipe having a second channel in communication with the second cavity;
   a flow regulation assembly comprising:
      a regulation valve rod rotatably installed in the first cavity, the regulation valve rod including a regulating block that is to change a flowable area of a first port of the communication channel or a flowable area of a first port of the first channel during rotation of the regulation valve rod;
      wherein a swivel base having a rotating groove is correspondingly disposed on the first end cover, one end of the regulation valve rod is fittingly mounted in the rotating groove of the swivel base in a rotatable manner, and the other end of the regulation valve rod passes through the first through hole and extends to outside of the first cavity;
   a push switch assembly comprising:
      a switch valve rod slidably installed in the second cavity;
      a return spring to act on the switch valve rod, wherein the switch valve rod includes a plugging block that is biased to block and/or shut off a flow path between the communication channel and the second channel under an action of the return spring, and at the same time, a fluid communication between the second channel and the communication channel is achieved by press driving the switch valve rod to change a position of the plugging block; and wherein a guide base having a guide groove is correspondingly disposed on the second end cover, one end of the switch valve rod is fittingly mounted in the guide groove of the guide base in a slidable manner, and an end opposite the one end of the switch valve rod passes through the second through hole and extends to outside of the second cavity, one end of the return spring is sleeved on the guide base and abuts against the bottom portion of the second cavity, and an end opposite one end of the return spring is sleeved on the switch valve rod and abuts against the plugging block.

2. The flow regulating push switch conjoined valve of claim 1, wherein the plugging block blocks and/or shuts off the flow path between the second channel and the communication channel by blocking a second port of the communication channel and/or a second port of the second channel, or by being located between the second port of the communication channel and the second port of the second channel; and wherein the fluid communication between the second channel and the communication channel is achieved when the plugging block is driven to move above or below both the second port of the communication channel and the second port of the second channel.

3. The flow regulating push switch conjoined valve of claim 1, wherein a limiting structure for cooperating with an upper end of the regulating block is disposed in the first cavity to achieve positioning, a lower end face of the regulating block is a helical end face structure with a gradually decreasing circumferential end face height, one of the first port of the communication channel and the first port of the first channel is correspondingly located at the regulating block, and the other one of the first port of the communication channel and the first port of the first channel is located below the regulating block.

4. The flow regulating push switch conjoined valve of claim 3, wherein a first sealing ring for fitting with an inner wall of the first cavity is installed on a rod body of the regulation valve rod in a limiting manner at a position above the limiting structure, so as to prevent leakage through the first through hole.

5. The flow regulating push switch conjoined valve of claim 1, wherein a blocking structure is disposed in the second cavity for cooperating with the plugging block to counteract the acting force of the return spring so as to limit continuous movement of the switch valve rod, a second port of the communication channel and a second port of the second channel are located at an upper side and a lower side of the blocking structure respectively, and the plugging block sealingly fits with the blocking structure.

6. The flow regulating push switch conjoined valve of claim 5, wherein a second sealing ring is installed on the plugging block in a limiting manner, so as to sealingly fit with the blocking structure.

7. The flow regulating push switch conjoined valve of claim 6, wherein a third sealing ring is further installed on the switch valve rod in a limiting manner, so as to fit with an inner wall of the second cavity to prevent leakage through the second through hole.

8. The flow regulating push switch conjoined valve of claim 1, wherein the opening of the second cavity is arranged vertically upwards.

9. The flow regulating push switch conjoined valve of claim 1, wherein the first channel, the second channel and the communication channel are all located on the same vertical plane.

* * * * *